United States Patent [19]

Straub

[11] 3,709,136
[45] Jan. 9, 1973

[54] PHOTOGRAPHIC SHUTTER
[75] Inventor: Helmut Straub, Hofen/Enz., Germany
[73] Assignee: Prontor-Werk Alfred Gauthier, G.m.b.H., Calmbach/Schwarzwald, Germany
[22] Filed: Jan. 29, 1971
[21] Appl. No.: 110,944

[30] Foreign Application Priority Data
Feb. 7, 1970 Germany..................P 20 05 718.5

[52] U.S. Cl......................95/62, 95/11.5 R, 95/64 C
[51] Int. Cl.............................G03b 9/14, G03b 9/70
[58] Field of Search........95/53 R, 62, 63, 64 R, 64 C, 95/11.5

[56] References Cited

UNITED STATES PATENTS 3,482,501  12/1969  Helber et al..............................95/63
3,323,433   6/1967  Pelikan....................................95/63 X
3,437,027   4/1969  Straub.....................................95/63 X

FOREIGN PATENTS OR APPLICATIONS 1,153,615   8/1963  Germany......................................95/62

Primary Examiner—Joseph F. Peters, Jr.
Attorney—Arthur A. March and K. M. Lefever

[57] ABSTRACT

An improved photographic shutter mechanism has a driving force which operates exposure aperture defining segments and also operates a first and second mechanical part. The second part, operatively connected to the aperture defining segments, is spring biased to follow the movement of the first part.

A setter mechanism is provided with respective control cam surfaces which coact with the first and second parts to determine the time of shutter operation and the extent of the aperture defined by the segments.

9 Claims, 6 Drawing Figures

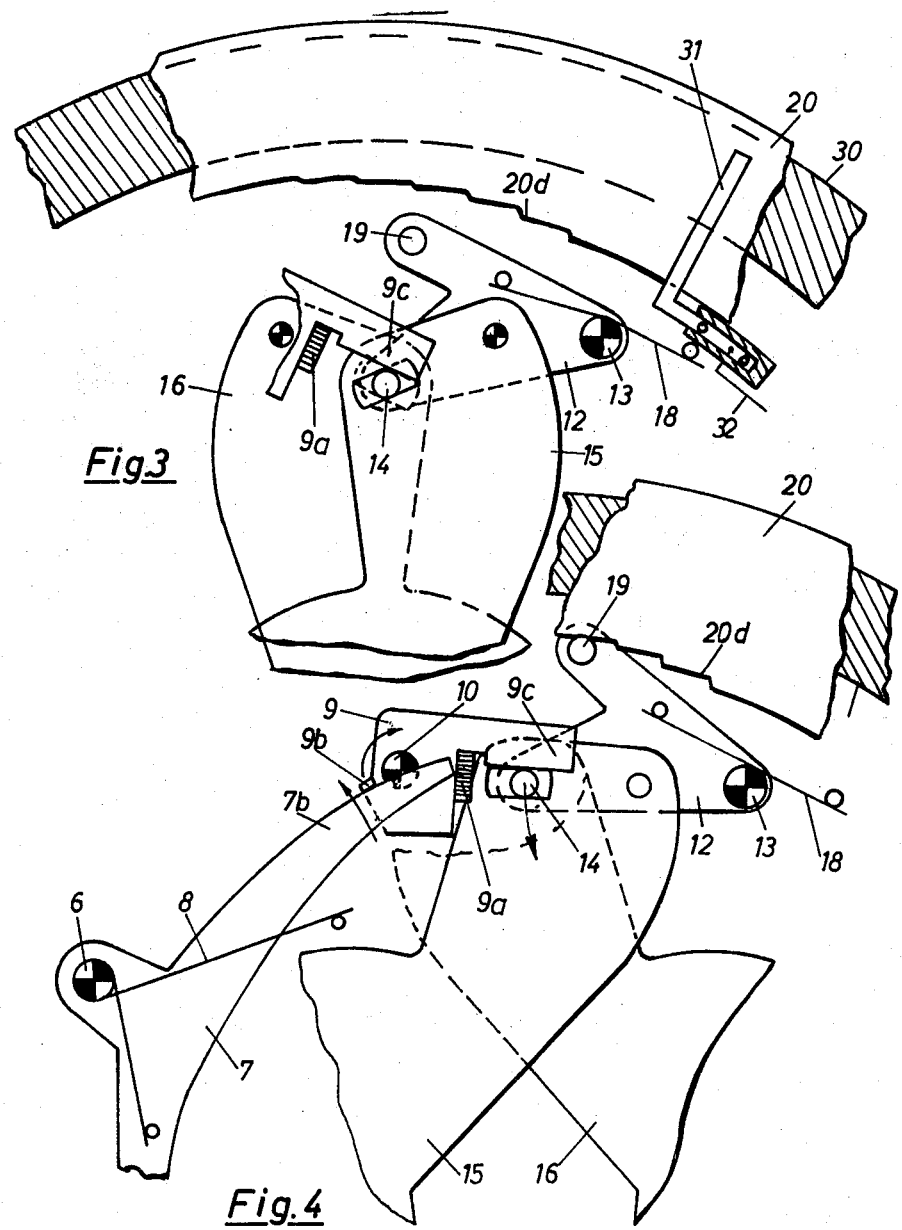

PHOTOGRAPHIC SHUTTER

FIELD OF THE INVENTION

The invention relates to a photographic shutter with a novel drive system, a system which drives the segments, for opening the lens passage and for the formation of variable focusing apertures, into a more or less substantial back and forth movement.

BACKGROUND OF THE INVENTION

The problem to be solved is based on the fact that a shutter of the above type has to be constructed, without considerable effort, into a simple, inexpensive, but nevertheless well-functioning diaphragm with well coordinated time-diaphragm values, and which controls a large focusing value region, far superior to comparable simple shutter arrangements.

SUMMARY OF THE INVENTION

This problem is solved, according to the invention, by supplying a member moving back and forth over a constant distance under the influence of a driving force and providing this member with another member biased into contact therewith under the influence of a driving spring, whose force or bias can be overcome by the driving force of the first member. This second member follows the movement of the first member, and is lockingly connected with the segments and also cooperates with a setter, more or less limiting the extent of movement of the segments. In this manner, the concept of a time-shutter program diaphragm, having optimum characteristics in construction and function, may be accomplished, which, in addition to the simple and well functioning construction, is distinguished by a wide focusing value range, available up to now only in diaphragm systems of a higher price range.

Essentially, this favorable result resides in the advantageous cooperation of the fast moving first member, with the second member following the first by its own moving drive. The second member is more or less limitable regarding its extent of movement.

It should also be emphasized that the advantageous effects obtained are made possible by the fact that the mass of the segments, including the parts moving together and also the actuatable drive means, may be so chosen that, in case of a weak restraining force influencing the driving system, the segments, which are in opening motion, are interceptable at the formation of a minimum aperture, say, one corresponding to approximately a diaphragm value of "22" which is coupled with an extremely short exposure time. Due to the rapid termination of movement of the first member of only a small mass, the necessity arises to expose the same, when setting the shortest exposure time, to the influence of a retarding mechanism, whereby the condition for a constant regulation of the time region from the shortest to the longest time interval is achieved. Consequently, the so-called "jump" is avoided, which, in known shutter systems, occurs at the transition of shutter times, with or without the influence of a retarding mechanism.

As viewed from the functional standpoint, a particularly advantageous and simple construction of the inventive shutter can be achieved in the manner that both the first member, moving back and forth, and also the second member following the first, are formed as pivotable lever. In addition, the setter includes a control cam in the path of the second member, determining its oscillation limit.

According to another feature of the invention, one is able, with relatively simple means, to achieve a constant control of the time range of the inventive shutter system by providing the first member with a retarding mechanism, controllable by a time setter, thus influencing this member through the entire time range. This arrangement avoids the disadvantage of known shutter systems, where the shortest exposure time is set by unretarded operation of the driving system, while, when setting longer exposure times, a retarding arrangement starts to act which, as well known, leads to unavoidable irregularities in time setting in the transition range.

According to another feature of the invention, the regulating element provided with a control cam for determining the diaphragm aperture formed by the segment, is closely connected with the controlling element carrying the control cam. In another advantageous manner it is possible, as far as the construction of the diaphragm permits, to use a regulating element, which is provided both with the control cam for determining the size, of the diaphragm aperture and with a further control cam for time control.

In order to achive, with flash-light pictures with the inventive diaphragm, an exact contact of the flash-light arrangement, it may be provided that the segments cooperate with a contact switch for electronic flash ignition, which, when reaching the preset diaphragm aperture defined by the segments, closes the circuit. In a especially simple and effective way this can be achieved if the regulating elements provided with a control cam for shutter setting forms part of the contact switch. Thereby it is assured that, when the segments occupy the aperture width corresponding to the preset diaphragm aperture, contact of the flash arrangement takes place.

According to another feature of the invention, requiring only a slight constructional effort, the selector supplied with the control cam for shutter setting is isolated, while the member coupled with the segments carries a contact pin advancing the control cam of the setter.

Finally, an advantageous feature of the invention is that the spring assigned to the second number is so determined that the aperture defining time of the segments, until complete opening, amounts to only a few ms about 5 ms. This is an advantage for flash lamp ignition, since- the same can also take place with the electronic flash contact, because the time difference between diaphragm apertures "22-" and "2.8" amounts to only a few ms., the most to about 5 ms. and the aperture forming time of the shutter, in the same manner as with known aperture forming times of the shutter, is only shorter by a few ms. that the the effective time, in this case, the flash time = 1/30 sec.

BRIEF DESCRIPTION OF THE DRAWINGS

Details of the invention are described below and shown in the drawings.

FIG. 3 shows details of the shutter in zero setting, with the setter being a component of a flash contact arrangement;

FIG. 4 shows the same arrangement in which the intermediate position of the contact member engaged by the segments is brought about by the contact;

DESCRIPTION OF THE PREFERRED EMBODIMENTS

Figure 1:
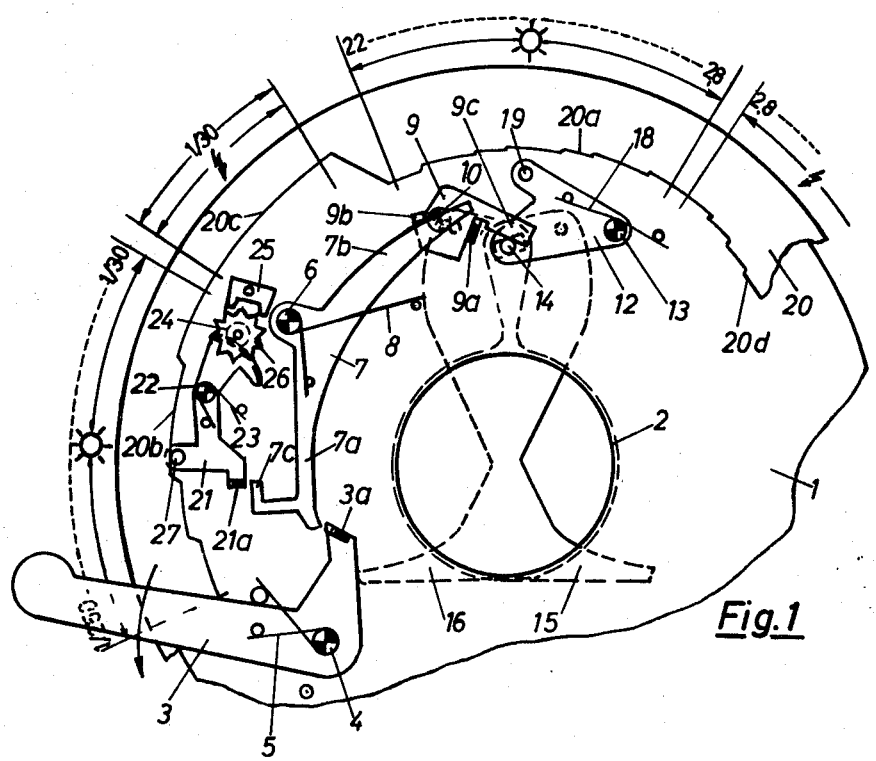
FIG. 1 illustrates a shutter arrangement constructed as a self-cocking shutter in initial position.

The drawing is limited particularly to the illustration of the constructive parts essentially necessary for the understanding of the function and design of the diaphragm.

Reference numeral 1 designates the ground plate serving for the fixing and placing of components of the diaphragm, which is supplied with an aperture 2. In the ground plate 1 of the diaphragm arrangement which, according to FIGS. 1 – 4, may be construed as a self-cocking shutter, there is provided a cocking and release lever 3, which pivots about a pin 4 and can be brought manually, against the influence of a reverse spring 5, into cocking and release positions (FIG. 2). A double-armed drive lever 7 cooperates with the cocking and release member 3, which lever 7 is pivotal on a pin 6. Also, the above mentioned cocking and release lever 3 is provided at its end towards the drive lever 7, with a projection 3a, provided with an inclined edge. This acts, during cocking of the lever 3, (designated by the arrow in FIG. 1) on the adjacent arm lever arm 7a of the drive lever which, thereby by increasing cocking moment of a drive spring 8, engaging the same, is brought into cocked position. The other arm drive lever 7b of, cooperates with a part 9, which pivots about a stationary pin 10 and which, driven by the drive lever, moves back and forth around its pivot pin. For this purpose, the part 9, on one side of pivot pin 10 is provided with a projection 9a with an inclined edge and, on the other side of the pin 10 with a stop 9b.

Moving 9, which, upon termination of the cycle moves back and forth a constant distance subject to the fixed position of the range of motion of the attachments 9a and 9b, cooperates with a further part 12, which is preferably formed as a lever and is pivotal on a pin 13. A coupling pin 14 is fixed on the free moving end of this lever, and, by way of a pin slot connection, engages oscillatable segments 15 and 16 on the ground plate 1. Under the influence of a drive spring 18, engaging the member 12, the coupling pin 14, in the initial position of the shutter, (FIG. 1), engages a finger-like extension 9c of the lever 9. The drive spring 18 must be chosen in such relation to the driving force acting on the drive lever 7 that the latter always overcomes the drive spring 18 which acts against the starting action when closing the segments 15, 16. Besides it should be so determined that the aperture forming time of the segments 15 and 16 amounts to only a few ms., in about the range of 5 ms. In addition to the coupling pin 14 engaging segments 15 and 16, the second part, that is the lever 12, is provided on its freely moving end with a further pin 19. This latter pin cooperates, as will be described later in detail, with a control cam 20a on the setter 20, more or less limiting the oscillating extent of part 12. This cam can be adjusted relative to part 12. In order to achieve absolute accuracy of the respective diaphragm apertures (FIG. 2) formed by the segments 15 and 16 at the end of the opening movement, the control cam 20a is preferably constructed as a step-like curve. While there could also be used a steplessly advancing control cam for reasons of the achievement and setting up a well-defined exposure and shutter values, the step-like construction, however is preferable. This is also important for the coupling and coordination of shutter-time values of a program device.

Figure 5:
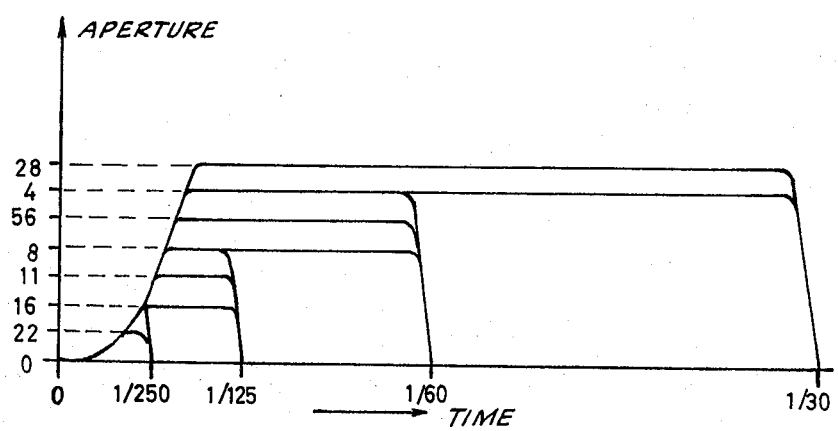
FIG. 5 shows light-time diagrams with shutter limits.

In order to achieve variable shutter times, the drive lever 7 is provided with a time regulating mechanism. This mechanism which is effective over the entire exposure time range (FIGS. 1 and 2) may be constructed, for example, of a two-armed segment lever 21. This lever is pivoted on a pin 22 and is influenced by a reversing spring 23 which exercises a constant clockwise turning movement on the same. A segment gear arm of lever 21 meshes with a pinion 24 angularly displaceable with a ratchet wheel 26, controllable by an escapement 25. The other arm of lever 21 is provided with a bent projection 21a, having an inclined deflector edge over which a hook-shaped means 7c on arm 7a of lever 7 is able to glide during cocking operation of this lever, following which (FIG. 2) means 7c falls behind the edge of projection 21a. For setting the required shutter time in combination with the shutter aperture value assigned to the shutter time the segment-lever 21 carries a pin 27 which, under the bias of spring 23 engaging the lever, engages a time-control cam 20b of the setter 20. According to the required shutter time-shutter aperture combination, the construction of the time control cam 20b and its relationship to the shutter control cam 20a may be such that the smallest diaphragm aperture, formed by the segments 15 and 16, which, e.g., may correspond to the shutter value "22", is coupled with the shortest exposure time value, for example 1/250 sec., and the largest diaphragm aperture formed by the segments, corresponding, for instance, to "2.8", is coupled with the longest exposure values, determinable by the control cams 20a and 20b, there may be arranged, as shown in the aperture-time diaphragm in FIG. 5, shutter time-shutter aperture combinations, which are suitable as intermediate values for a proper exposure.

Regarding the specific construction of the shutter control cam 20a, relative to the position of the lever 12, this can be such, that when setting the shutter value "22," it permits the smallest, and when focusing to the shutter value "2.8" the largest, oscillation movement of the segments 15 and 16. The actual time-control cam 20b, for daylight photography, the focusing range of which, as well as the shutter aperture control cam 20a, each identified in FIGS. 1 and 2 with a sun symbol, can be connected to a further cam segment 20c, identified by a zig-zag (lighting) symbol, which makes it possible to set the retarding mechanisms 21 to 27 to a shutter time suitable for flash pictures of, for example, 1/30 sec. Supplementing this cam segment 20c, there may be provided a control cam 20d on the setter 20 (only partially indicated in FIGS. 1 and 2), which permits the choice of the shutter aperture values, in day-time range, at one and the same flash time of 1/30, defined by the cam segment 20c. In addition, there may be provided a shutter-control cam for B-focusing.

Figure 2:
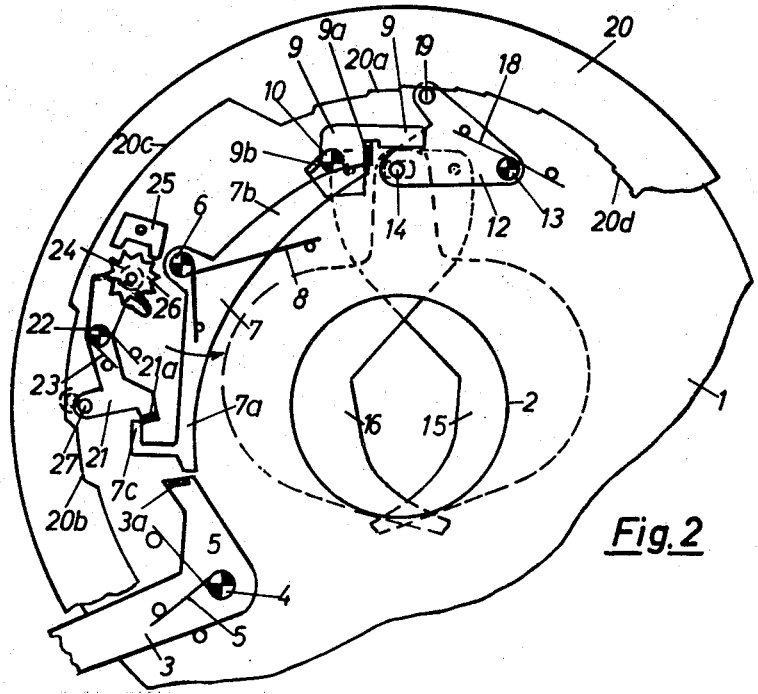
FIG. 2 shows the shutter during its entire cycle in reverse phase, whereby the segments form a diaphragm aperture corresponding to the setting.

FIGS. 1 and 2 show a construction in which both the aperture and time control cams for exposure are formed on one and the same setter 20. However, if the construction of a diaphragm requires, these cams may also be arranged on different setters. However, in that case, these setters must be secured against relative rotation. The operation of the self-cocking shutter, described above and shown in FIGS. 1 and 2 is as follows:

According to the required adjustment of a program setter (not shown) of the camera, the shutter control cam 20a, formed on the setter 20, reaches a certain position relative to the lever 12 which is connected with the segments 15 and 16, while the other time control cam 20b, provided on the setter 20, transmits to the segment lever 21, an initial setting determining the retarding action on the drive lever 7. When the cocking and releasing lever 3 is actuated and moved in the direction of the arrow in FIG. 1, the projection 3a thereon picks up the drive lever 7, whereby, with simultaneous increase of the cocking moment of the drive spring 8, the hook 7c on the drive lever glides along the inclined edge 21a of the segment lever 21, and the outer face of the lever arm 7b of the drive lever glides along the inclined upward projection 9a of the part 9, with the result that both ends of the drive lever are, to a steadily increasing extent, lifted out of the actual poane of motion. During turning movement of lever 7, finally, the hook 7c glides over the highest part of the projection 21a to take its position behind the same. Also, the lever arm 7b, after overcoming the inclined edge 9a, is engaged, therebehind directly before the projection 3a of the cocking and release lever 3 is disengaged from the end of the drive lever 7 facing projection 3a. If this takes place, the driving lever 7, driven by the relatively increasingly stressed spring 8, pivots around the pin 6 in counterclockwise direction, as shown by the arrow in FIG. 2. At the start of this motion cycle, the lever arm 7b of the drive lever 7 first acts on the projection 9a of part 9 and moves the same, due to its small mass, counterclockwise with high acceleration around the pin 10. Since the second part 12, being under the influence of the action of its own drive spring 18, together with pin 14 connected with segments 15 and 16, is engaged the finger-like member 9c of the first part 9, the second part 12 directly follows the motion cycle of the first part 9. Due to the weaker construction of the drive spring 18, on the one hand, and to the relatively large accelerating masses of the segments 15 and 16, on the other hand, the second part 12 can follow the first only after a constantly increasing interval. Thereby, sooner or later, the pin 19 engages the step of the shutter control cam in its range of motion, with the result that during the following shutter cycle, the segment system 15, 16, forming the diaphragm aperture, stops. In this phase of motion, the lever arm 7b still engages the projection 9a on the part 9 but then disengages projection 9a to immediately engage the projection 9b behind the pin 10, whereby the direction of movement of part 9 is reversed and the finger-like member 9c is now driven in the opposite direction. During reverse movement the member 9c moves the coupling pin 14 in the opposite direction overcoming of the action of the spring 18, and thereby moves the segments 15 and 16 to closing position (FIG. 1). According to the exposure value set by setter 20, sooner or later, during the cycle of the drive lever 7, the hook 7c abuts against the projection 21a of the segment lever 21 and pulls the same over a more or less large distance. This means that drive lever 7, effecting opening and closing of the segments 15 and 16 through the turning angle range, depending on the setting of the segment lever 21, is exposed to the influence of the retarding means 21–27, and thereby the time interval necessary for opening and closing segments 15, 16 is determined. If, thereafter, the cocking and releasing lever 3 returns from its cocking position into its original position, the projection 3a bypasses the outer surface of the drive lever 7 and then, finally, takes the initial position shown in FIG. 1.

As seen in FIGS. 3 and 4, the setter 20, provided with the aperture control cam 20d limiting the oscillation range of the second part 12, may be movably arranged on a part 30 which, in contrast to the setter itself, is constructed of an electrically non-conductive material. This insulated setter 20, and the pin 19, fixedly arranged on the second part 12, form the contact switch of a flash contact arrangement (not shown) which transmits, with absolute certainty, an ignition impulse corresponding to the setting of the aperture value, when the contact pin 19, engages the step of the shutter control cam 20b determining setting of the diaphragm aperture, and the segments 15 and 16 (FIG. 4) open the lens passage for exposure of the film. For the galvanic connection of the metal setter 20 with a source of energy for generating the ignition impulse (not shown), a slider 31 engages the setter which is galvanically connected, over a circuit 32, with one of the terminals of the source of energy. It is self-evident that a contact is also established if the contact pin 19 engages one of the steps of the shutter control cam 20a for the day-light range, whereby the photographer has the opportunity to take flash pictures by using an electronic flash member.

Figure 6:
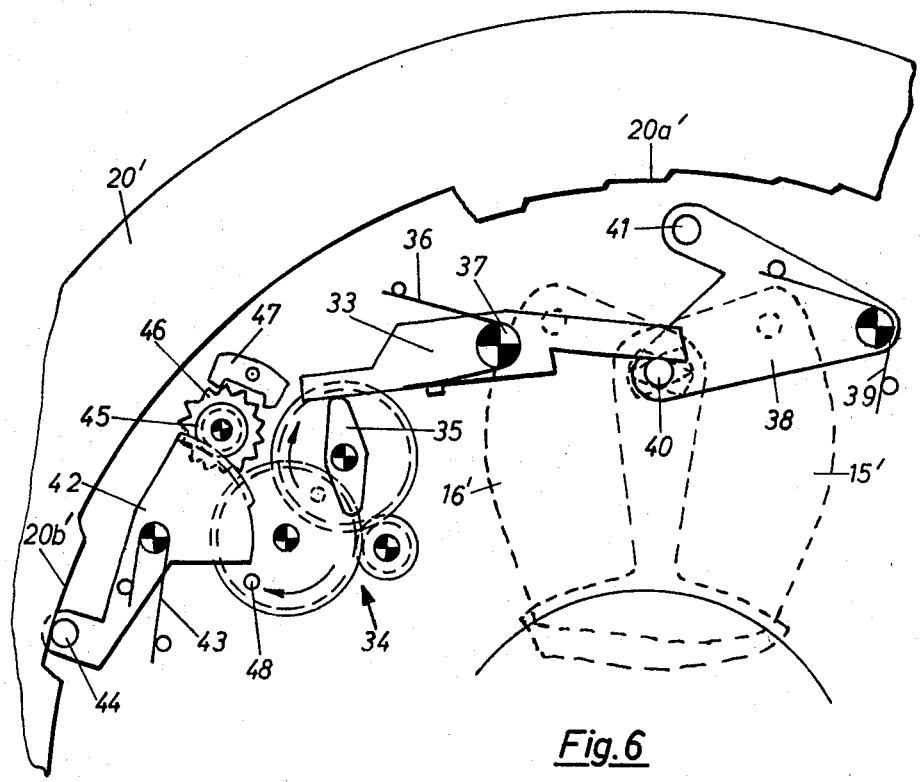
FIG. 6 shows a diaphragm constructed as a cooking shutter, whose member, moved back and forth, is driven by a spring-driven assembly.

FIG. 6 shows a program shutter constructed as a cocking shutter which, in function and design, is in principle identical with that of the construction of FIGS. 1–4. Only the starting mechanism is differently chosen, namely, in that the first part 33, opening and again closing the segments 15 and 16, is operated by way of a drive assembly 34, driven by a spring or motor to have a back and forth motion. The drive assembly is in connection with an adjusting cam 35 with which, under the effect of a reversing spring 36, one of the arms of the first part 33 is engaged. The other arm of the first part 33, pivotal on a pin 37, works in the same manner as in the construction already described in connection with FIGS. 1–4, together with the second part 38, connected for movement with the segments 15' and 16', which is biased by a spring 39 in such a manner that the pin 40, coupled with the segments, is engaged with the lever arm of the first part assigned to the same. The second part 38, supplied with a striking contact pin 41, is also associated with a setter 20', having a shutter control cam 28a' and a time control cam 20b'.

In the range of movement of the control cam 20b' there is provided a retarding mechanism which is formed of a pivotal segment lever 42 biased by a spring 44 and which, on the one hand, carries a pin 44, engaging the control cam and, on the other hand, is engaged with a pinion 45 by way of a segment gear. The pinion is fixedly connected with a ratchet wheel 46, which is provided with an escapement 47. Finally, a side edge on the segment lever 42 is arranged in the path of motion of a drive pin 48 fixed on a rotating part of the moving mechanism 34. Thereby, the segment lever 42 may be influenced by the time control cam 20b', in its set position, in a way that the pin 48, during the following termination of the cycle of the moving mechanism 34, more or less must dislodge the segment lever 42.

What is claimed is:

1. A photographic shutter with a driving system, having aperture-defining segments movable by the driving system through variable displacements to define selected exposure apertures for a lens, comprising, in combination, a first part reciprocable through a fixed distance; means operable to apply a driving force to said first part to reciprocate the same through said fixed distance; a second part connected to said segments to displace the same, and reciprocable by said first part; a drive spring biasing said second part to engage said first part to follow the movement of said first part; said driving force, acting through said first part, exceeding the bias force of said drive spring on said second part; and a setter cooperable with said second part and controlling movement of said segments.

2. A photographic shutter with a driving system, as claimed in claim 1, in which said first and second parts comprise pivotally mounted oscillatable levers; said setter including a control cam arranged in the path of movement of said second part and limiting the extent of movement of said second part.

3. A photographic shutter with a driving system, as claimed in claim 1, including a time regulating mechanism operatively associated with said first part and controlling movement of said first part; and a shutter time setter operatively associated with said time regulating mechanism and effective on said time regulating mechanism throughout the entire range of shutter times.

4. A photographic shutter with a driving system, as claimed in claim 1, in which said setter includes a control cam controlling opening movement of said segments in accordance with a preselected aperture value; and a second setter secured to move with said first mentioned setter, said second setter including a shutter time control cam operatively associated with said driving system.

5. A photographic shutter with a driving system, as claimed in claim 1, in which said setter includes a first control cam limiting opening movement of said segments in accordance with a preselected aperture value; said setter including a second control cam cooperable with said driving system to control the shutter time setting.

6. A photographic shutter with a driving system, as claimed in claim 1, including a contact switch for electronic flash ignition; and means, operatively associated with said segments, operable to close said contact switch responsive to said segments defining a preselected aperture value.

7. A photographic shutter with a driving system, as claimed in claim 6, in which said setter includes a control cam limiting opening movement of said segments in accordance with a preselected aperture value; said control cam forming a component of said contact switch.

8. A photographic shutter with a driving system, as claimed in claim 7, in which said setter is mounted in an electrically insulated manner; said second part carrying a pin, constituting a switch contact, engageable with said control cam.

9. A photographic shutter with a driving system, as claimed in claim 1, in which said drive spring has a bias force such that the time required for said segments to form a fully open aperture is only of the order of 5 milliseconds.

* * * * *